United States Patent [19]

Haast et al.

[11] Patent Number: 5,616,355
[45] Date of Patent: Apr. 1, 1997

[54] LYOPHILIZED HEALTH FOOD PRODUCTS AND METHODS OF MAKING SAME

[76] Inventors: William E. Haast; Nancy G. Harrell, both of 34879 Washington Loop Rd., Punta Gorda, Fla. 33982

[21] Appl. No.: 463,882

[22] Filed: Jun. 5, 1995

Related U.S. Application Data

[63] Continuation-in-part of Ser. No. 185,046, Jan. 24, 1994, abandoned.

[51] Int. Cl.⁶ ........................................................ A23L 3/44
[52] U.S. Cl. .......................... 426/384; 426/385; 426/440; 426/445; 426/524; 426/615
[58] Field of Search ..................................... 426/384, 385, 426/440, 445, 524, 615

[56] References Cited

U.S. PATENT DOCUMENTS

| H70 | 6/1986 | Berkowitz et al. | 426/385 |
|---|---|---|---|
| 3,472,663 | 10/1995 | Laskin | 426/385 |
| 3,619,204 | 11/1969 | Katz | 426/512 |
| 4,305,969 | 12/1981 | Munk | 426/385 |

FOREIGN PATENT DOCUMENTS

| 45-19625 | 4/1970 | Japan | 426/385 |
|---|---|---|---|

*Primary Examiner*—Helen Pratt
*Attorney, Agent, or Firm*—Kenneth E. Darnell

[57] ABSTRACT

Food products and methods of making having a high dietary fiber content and unexpected organoleptic characteristics, the invention takes the form of a substantially solid or semi-solid substrate formed primarily of dietary fiber soaked in or permeated by a flavorful material such as a natural juice, liquefied or pureed fruit or the like, the combination then being at least partially lyophilized to a solid or semi-solid consistency. The concentration of the natural juice or other flavorful material within a framework or lattice provided by the dietary fiber causes a burst of flavor to be experienced when eaten. While the lyophilized substrate can preferably be consumed as a bar-like comestible with or without the addition of other materials such as coatings, fillers and the like, the invention contemplates the formation of the substrate as flakes, as a cookie, as a candy such as a semi-soft roll or sheet consumed flat or as a rolled sheet among other forms.

14 Claims, No Drawings

LYOPHILIZED HEALTH FOOD PRODUCTS AND METHODS OF MAKING SAME

CROSS-REFERENCE TO RELATED APPLICATION

This application for patent is a continuation-in-part of U.S. patent application Ser. No. 08/185,046, filed Jan. 24, 1994, by the same inventors, the parent application being abandoned as of the filing date of this application for patent.

BACKGROUND OF THE INVENTION

1. Field of the Invention

The invention relates to dietary fiber food products and particularly to such products having not only exceptionally high levels of dietary fiber but also exceptional organoleptic properties due to high flavor content from a natural juice or juices and the like which are concentrated in or on the fiber by lyophilization.

2. Description of the Prior Art

Dietary fiber has long been recognized as an essential part of the human diet, such fiber being generally defined as those portions of plant materials normally consumed in the diet and which are resistant to digestion by enzymes produced in human digestive processes. Dietary fiber is generally considered to comprise those polysaccharides, lignins, etc. which are not digested in human digestive processes. While fiber can be considered to substantially comprise insoluble fiber usually thought of as filament-like plant materials, the term "dietary fiber" also extends to materials which are soluble in water with such materials usually being gelatinous in nature. Presently accepted dietary standards call for consumption of dietary fiber including both insoluble fiber and soluble fiber.

Benefits considered to be realized through consumption of appropriate quantities of dietary fiber include regular and healthful function of the digestive system, reduction in diseases such as diseases of the colon, diabetes, hypoglycemia, hypercholesterolemia, hypertriglyceridemedia, and the like. Dietary fiber also acts to control metabolic rates and as such can actually be used as a treatment rather than as a mere dietary element. Typical quantities of dietary fiber recommended for inclusion in the human diet range from 20 to 35 grams daily. Since the usual diet in the United States apparently provides only one-third to one-half of this recommended daily quantity of dietary fiber, substantial efforts have been made especially in the relatively recent past to fortify food products such as breads and breakfast cereals in order to yield a greater quantity of dietary fiber in the diet. Additionally, snack and convenience foods have been also modified in order to provide increased dietary fiber even to the extent that so-called "health" bars such as granola bars and the like have received substantial acceptance as health foods even though the fiber content of such foods is typically less than five percent by weight. A typical granola bar weighing approximately one to two ounces usually provides less than one gram of dietary fiber. The addition of greater amounts of dietary fiber in health snacks such as granola bars and the like invariably impacts in a negative fashion the organoleptic qualities of the food product. Such food products having even minor amounts of increased dietary fiber in the form of supplements or additives result in a food product which is excessively dry and which has a taste and mouthfeel which is unacceptable. On the other hand, natural foods having relatively high levels of dietary fiber simply do not provide the desired quantities of dietary fiber in the diet due to the relatively low levels of such fiber in these natural foods and due also to the quantities of such foods which most individuals would normally consume in even a diet which is oriented toward health considerations. In spite of the large number of health food products now available to the consumer and which are purported to contain high levels of dietary fiber, a need still exists for a food product having high levels of dietary fiber and which also has a high level of taste acceptance. The present invention provides health food products capable of taking a number of forms and which exhibit extraordinarily high dietary fiber content and which have extraordinary taste appeal due to the concentration of naturally tasteful materials such as natural fruit juices and the like within a framework or matrix of dietary fiber, the consumer being enticed into increasing dietary fiber intake due to the exceptional taste of the food product itself.

SUMMARY OF THE INVENTION

The invention provides health food products and methods for making these products, the intent of the invention being to provide the present food products with an extraordinarily high proportion of dietary fiber while at the same time imparting to the food products unexpected taste qualities. The health food products of the invention can take a variety of forms and for this reason the basic form of the products will be referred to as a substrate or as a bar for the sake of convenience. The food products of the invention can assume a bar-like form of a size and weight similar to the "granola" bars or other fiber bars which are known in the art. The food products of the invention can further take the form of flakes, shaped substrates such as occur with cookies and the like, as candies including semi-soft rolls or as sheets which can be rolled into a candy-like food product. Particular substrates formed according to the invention can take the form of planar, sheet-like layers either formed together along planar surfaces or interspersed with layers of other food materials which differ in composition from the particular edible substrates of the invention. As an example, one or more sheet-like layers of edible materials comprised of lyophilized combinations of edible dietary fiber and natural juices, for example, can be disposed in desired locations within a granola bar or other fiber bar to add not only additional dietary fiber to such a bar, but also to add the characteristic burst of flavor of the present food products brought about by the concentration of the essences and organoleptic properties of the natural juices and similar materials permeated into the dietary fiber prior to lyophilization of the combination. In such a form, the present food products increase the fiber content and palatability of healthful food products such as granola bars and the like. As a further example, the substrates of the invention can take the form of flakes and the like such as are described by Linscott in U.S. Pat. No. 4,871,557, the disclosure of which is incorporated hereinto by reference, wherein the compressed flakes of supplemental dietary fiber of Linscott can be formed according to the present invention and added to a fiber bar such as a granola bar to add additional fiber to such a granola bar and to also increase the taste acceptability of same.

According to the invention, flavorful materials, particularly liquids such as natural juices and the like, are mixed with dietary fiber of either the soluble or insoluble type or a combination thereof, the flavorful liquid material being allowed to soak into, permeate and/or thoroughly mix with the dietary fiber prior to freezing of the combination with subsequent lyophilization of the combined material. The resulting product, regardless of physical shape, thickness, etc., contains a high percentage of dietary fiber and a high level of palatability especially in view of the high level of fiber in the food product. The taste of the present food products can best be referred to as a "burst of flavor" due to the fact that the lyophilization process acts to concentrate the flavorful principles contained within the flavorful liquids including those essences and the like which appeal to the olfactory sense. Particularly desirable flavorful liquids include the natural juices although similar materials artificially formed can be used to produce acceptable products.

The dietary fiber and flavorful substrates of the invention can be produced with any soluble or insoluble fiber which would be considered suitable to the human diet and may include binders, fillers and the like including conventional diet food materials such as rolled oats, crisped rice, chopped nuts and the like which can be formed integrally with the present food substrates. Further, the present food substrates can be formed with coatings of dietarily acceptable materials such as chocolate or the like in order to increase palatability, ease of handling of the food product and packaging of the food product inter alia.

The lyophilization process or processes which can be employed according to the invention include those processes wherein the essences and flavorful constituents of the liquid materials, such as natural juices, forming a combination with the edible fiber is caused to have the basic solvent thereof removed therefrom, such basic solvent typically being water, so that the essences and flavorful constituents remain with the dietary fiber with minimum diminishment of the organoleptic effects thereof. The processes contemplated by the invention generally include a "freezing" of the combined fiber and liquid followed by the subjection of the frozen or substantially frozen combination to pressure sufficiently low to cause sublimation of the solvent material or materials. It should be understood that the freezing of the fiber and liquid combination can take the form of a densification of the combined materials to a desired consistency. Of particular note to the present methodology is that the natural solvent such as water within the materials sublimes from the "frozen" combination without substantial removal of essences and organoleptic constituents from the combination.

While a relatively dense product can be formed by the simple freezing of a flavor component and a fiber component followed by lyophilization, a less dense and somewhat expanded product can be obtained by producing a slurry of components according to the invention and reducing the temperature of the slurry to approximately 0° C. followed by reducing pressure on the cold slurry to just below atmospheric, i.e., to about 28" of mercury, the pressure being applied while the slurry is then frozen. The process causes an expansion of the slurry during freezing to a less dense condition. Lyophilization then removes moisture to form a substantially dry product.

Accordingly, it is a primary object of the invention to provide healthful food products having unexpected organoleptic characteristics and formed primarily from dietary fiber with which a flavorful material such as a natural juice has been combined with the combination thereof being at least partially lyophilized to a consistency, preferably a solid consistency, for use as a food product or in a combination with other food products, thereby producing a food having high dietary fiber content with unexpectedly acceptable flavor.

It is another object of the invention to provide health food products in lyophilized form which can be consumed as a bar-like comestible with or without the addition of other materials such as coatings, fillers and the like and which has an unexpectedly high proportion of dietary fiber coupled with unexpected taste qualities.

It is a further object of the invention to provide food products having a lyophilized substrate which can take a variety of shapes such as flakes, bars, sheets, rolled sheets, semi-soft rolls and the like which either solely or in combination with other dietary materials form high fiber food products having unexpectedly high palatability.

It is yet another object of the invention to provide lyophilization processes for producing the comestibles of the invention.

Further objects and advantages of the invention will become more readily apparent in light of the following detailed description of the preferred embodiments.

DESCRIPTION OF THE PREFERRED EMBODIMENTS

The invention provides food products having high dietary fiber content and unexpected organoleptic characteristics, these food products being capable of taking a variety of forms in a variety of products. For various reasons including the disclosure of various types of soluble and insoluble dietary fiber, the disclosure of various materials utilized in the formation of granola bars, that is, high dietary fiber "health" bars and the like including coatings, fillers, binders and the like, as well as the disclosure of forms of supplemental dietary fiber which can be formed according to the invention, the disclosure of U.S. Pat. No. 4,871,557 to Linscott is incorporated hereinto by reference.

One preferred embodiment of the invention takes the simple form of a bran bar having the shape of a rectangular solid in much the same fashion that a granola bar or health food bar takes a similar shape. Such a bar is conveniently formed of a bran material such as wheat or oat bran but it is to be understood that any edible fiber or dietary fiber can be utilized in this embodiment of the invention. The fiber or fibers chosen are admixed with natural juices including orange juice, apple juice, grapefruit juice and the like with the fiber being soaked in the juice for a period of time necessary to absorb the juice into the fibers. The bran and juice may be combined in an aqueous suspension in order to produce absorption by the fibers or permeation of the juice into the fibers. The combination so produced is then formed into a bar shape unless the fiber is formed into a bar prior to soaking by the juice and the bar is frozen and subsequently lyophilized to form a health food bar which can be consumed as is. It should be understood that the combined fiber and juice could be frozen and then lyophilized without formation into a bar or other desirable shape. In such a situation, the material of the invention produced by the lyophilization process can then be formed into a desired shape such as the shape of a bar.

The soaking step accomplished according to the invention is preferably carried out under refrigeration with the soaked bran resulting in a slurry which can be frozen. In this situation, the material resulting from the lyophilization process is then formed into a desired shape or utilized as loose material with other food materials in the formation of a health food product.

As taught herein, the term "frozen" is intended to include temperatures which act to lock the juice material in place in or on the bran material so that the lyophilization process sublimates the water within the juice material leaving the aromatic, nutritional and flavorful components of the juice in or on the bran and in an unaltered, intensely flavorful state.

On contact between the food product of the invention and the saliva of a consumer, the consumer experiences an immediate burst of flavor which is intense. The flavorful food products of the invention not only provide an intensely flavorful food but also an extremely healthful natural food due to the high percentage of dietary fiber present in the food and due to the nutritional content of the juice material which is contained therein. With only a single health food bar prepared according to the invention, a large percentage of an individual's daily fiber requirements can be provided and with a food product which is intensely flavorful and therefore readily and pleasurably consumed by the individual. Previous health food bars contain only a small proportion of dietary fiber in each bar and usually suffer a decrease in organoleptic quality when the fiber content is over only a few percent. As is noted in U.S. Pat. No. 4,871,557 to Linscott, mentioned previously, granola bars and the like having only a relatively small proportion of fiber must mix a variety of sugars and high calorie, usually sweet, materials into the granola bar in order to form a product having any degree of acceptable taste and mouthfeel.

According to the invention, a desirable ratio by weight of dietary fiber to natural juice in the bar thus described is approximately 20% or less fiber with 80% or more juice by weight. However, after the lyophilization process, a large proportion of the water is removed from the combination with the fiber then constituting a high proportion of the bulk of the resulting food product.

It is to be understood that the food product of the invention can be formed in a variety of shapes and with an extraordinarily wide variety of fiber and "juice" materials. In fact, the "juice" material need not be selected only from the group of natural juices such as fruit juices, but can also take the form of vegetable juices and juice-like materials which need not be of natural origin but which can be otherwise manufactured. Normally solid materials having flavorful qualities can be constituted in aqueous solution as can be the natural fruit and/or vegetable juices inter alia for soaking into the fiber as well as for being laid down on the fiber in situations where the flavorful material does not soak into the matrix or lattice provided by the dietary fiber. Thus, the liquefied fruits and the like as well as pureed fruits and the like may be used as the "juice" material, i.e., the flavorful component.

The flavorful component of the invention which is preferably chosen from natural fruit and vegetable juices can take the form of natural or artificial materials. The various materials useful according to the invention may be mixed with water to form an aqueous suspension or solution in which the fiber is soaked. Combinations of these flavorful materials can be mixed together to form this component of the combination which is to be absorbed by the fibers or taken onto the fibers, it typically being preferred that this component take the form during the combining process of a liquid in order to facilitate absorption or the like. Typically juices such as orange juice, apple juice, grapefruit juice, various citrus juices and fruit juices of virtually any description can be employed along with vegetable juices, artificial juices or flavors such as natural vanilla flavor, coconut flavor, natural butter flavor and the like, with the imagination of the practitioner being the only limit to the nature of the material employed.

The dietary fiber can take the form of natural plant fibers including wheat bran, oat bran, soy fiber, apple fiber, corn bran, barley bran, rye bran, triticale bran, cellulose, pea fiber, sugar beet fiber, peanut fiber and the like, these materials generally being referred to as insoluble fibers. Such insoluble fibers can be utilized alone according to the invention or can be formed with soluble fibers which include, but are not limited to, gum arabic, gum ghatti, guar gum, pectins, psyllium, carrageenans, zanthan, tragacanth, caraya, locust bean gum, agar and alginates. Suitable food binders can also be employed which include rice flour, wheat flour, oat flour, corn flour, rye flour, potato flour, and mixtures thereof to name but a few. It is to be understood that the invention can be practiced without the use of binders. It is also to be understood that the dietary fiber component of the invention preferably comprises more than 50% of the fiber as insoluble fiber, but is not so limited.

Either before or after admixture of the dietary fiber component of the invention with the flavorful component, various food materials typically a part of health food product can be added to the combination which is then lyophilized, such materials including rolled oats, chopped nuts, crisped rice, coconut and the like. These food materials can be present during the lyophilization process. As an alternative, such food materials can be added after the lyophilization process prior to a forming step. Reference is made to U.S. Pat. No. 4,871,557, the disclosure of which is incorporated by reference, for a listing of various other materials which can be added to the food product of the invention depending upon the resulting product which is desired.

The food product of the invention can be formed into a variety of shapes including cookie shapes, wafers, and the like and can be of a desired thickness such as is desired for the resulting product which is to be manufactured. Thin wafers of the present food product can be formed together into a desired thickness to form a product such as a bar, cookie, etc. or can have layers of other food materials between layers of the food product wafers of the invention, such combinations being possible to form either crispy or chewy textured food products. It is further to be understood that food products according to the invention can be formed with a coating, such as chocolate, yogurt, peanut butter, etc., such coatings being conventional in the art and conventionally formed on such food products. A coating on the food products of the invention acts to prevent moisture absorption by the food products in the absence of a containing wrapper.

It is also to be understood that the food products of the invention can be subjected to lyophilization to a degree which will either cause the food products to be substantially solid in consistency, those materials sometimes referred to as "semi-solids" being included in this definition. An example of a semi-solid food material herein intended is the well-known candy known as a Tootsie Roll.

The combined fiber component/flavor component material after lyophilization can be formed into flakes or even a flour-like consistency for addition to other foods and particularly foods incapable of transferring moisture to the health food products of the invention.

The lyophilization process intended for use in the invention can be taken to be any such process wherein a solvent such as water is sublimed from the frozen combination. In a usual process, the frozen fiber component/flavor component combination is maintained at a temperature of between $-25°$ C. and $-50°$ C. under a pressure of approximately 0.1 to 1.0 mm Hg. It is to be understood that freeze drying processes can occur in other temperature ranges and at other pressure levels and that the invention contemplates the use of temperatures and reduced pressures which are effective to accomplish the objects of the invention. Of primary importance according to the teachings of the invention is the concentration of the aromatic, nutritional and flavorful constituents of the flavor component such as a natural juice within the fiber or on the fiber, the lyophilization process acting to concentrate these constituents due to the sublimation of water from the frozen flavor material.

The percentage of the dietary fiber component utilized to form the combination of the fiber soaked with the flavor component such as a natural fruit juice can take a widely varying range. While as much as 20% fiber by weight can be admixed with 80% or more aqueous juice by weight, greater percentages of fiber can be employed up to at least 60% of fiber while retaining acceptable organoleptic properties in a finished product. By the same token, less fiber can be employed down to only a few percent, the critical factor being that a sufficient amount of fiber is present to absorb or adsorb the flavor component prior to lyophilization. When using both soluble and insoluble fiber, the proportion of insoluble fiber to soluble fiber may vary according to taste and processibility.

In another typical formulation, the fiber component can be a mixture of approximately 20% wheat bran and 80% oat bran. This fiber component may then constitute approximately 20% of the pre-lyophilized mixture with approximately 80% thereof constituting 35% orange juice and 45% water. Desirable substitutes and/or additions include citrus fiber in the fiber component and apple or mango juices or purees in the flavorful material.

In yet another formulation, a mixture of 3.25 grams of insoluble wheat bran is admixed with 20.15 grams of soluble oat bran. Banana puree and orange juice concentrates are added in amounts of 5.2 grams and 46.8 grams respectively. A quantity of 54.6 grams of water is then added and the mixture is allowed to stand to complete the "soaking" or agglomeration process. After forming into a desired shape, the material is frozen and lyophilized. The initial 130 grams of material lyophilizes to 43.3 grams with approximately 23.3 grams constituting the fiber component and the balance constituting the flavorful component.

The combinations of one or more flavorful components and one or more fiber materials as described above are typically blended to a slurry consistency prior to freezing in the method of the invention previously described. That methodology produces a relatively dense product. A second method according to the invention produces a less dense product which is "expanded" essentially during a freezing step with the frozen combination then being freeze dried in essentially the same manner as occurs according to the method or methods previously described. Any of the combinations previously described can be used in this second processing method, it being desirable to form the compositions into a slurry prior to freezing. The temperature of the slurry is then taken to approximately 0° C. or that temperature which is just above the freezing point of the slurry. The temperature of the slurry can then be held at this temperature or the temperature can continue to be lowered while a vacuum of approximately 28" mercury is applied and held constant over the slurry until the average product temperature reaches approximately −10° C. or lower if a lower temperature is necessary to freeze the slurry. When the relatively low pressure is applied to the cold slurry, the slurry "expands" or becomes less dense via an expansion produced by the relatively low pressure imposed upon the slurry. The slurry is thus frozen and "locked" into this "suspended" or expanded state while the frozen slurry is then subjected to a lyophilization process as is described herein. The frozen, expanded slurry resists collapse while lyophilization proceeds. In most situations, the slurry expands to approximately twice its original mass although the pressure level can be adjusted to cause expansion of other degrees, a lower pressure generally causing a greater expansion. The expansion of the slurry acts to increase sublimation and to substantially reduce drying time.

A combination of slurried fruit, bran fiber and water weighing approximately 51 grams will result in a dry product weight of approximately 24.5 grams in a finished product processed according to this second method, the method allowing retention of organoleptic properties including mouthfeel and the characteristic burst of flavor of the products according to the invention while producing a less dense product having desirable uses either as is or in combinations with other food materials. The slurry used in this second method should have a firm consistency and be taken to a first temperature before expansion which is consistent throughout the slurry. In such a situation, the slurry will spontaneously freeze when the pressure is lowered to 28 to 30" of mercury.

Generally, the products of the invention can be produced in molds to yield a desired shape. When produced as a bulk item which is then added to other food materials, the shape of the lyophilized product is immaterial when the product is to be reduced to granules, powders, etc. According to usual practice of the invention, approximately ⅓ bran as the fiber component and ⅔ fruit juice/water as the flavorful component produce desirable food products.

While the health food products of the invention have been described in detail relative to a few preferred embodiments, it is to be understood that the invention can be practiced other than as described in detail herein with the ratios of components and process parameters varying as desired to accomplish the objects of the invention.

What is claimed is:

1. A method of making a substantially solid nutritional food product rich in dietary fiber and having improved organoleptic characteristics when consumed as a solid food product, consisting of the steps of:

contacting a dietary fiber component with a flavor component capable of being concentrated by lyophilization, the flavor component being absorbed into or adsorbed on the fiber, the dietary fiber component being additional to any dietary fiber present in the flavor component;

reducing the temperature of the combination of the dietary fiber and flavor component to a temperature immediately above the freezing point of the combination;

reducing pressure imposed on the combination to cause volumetric expansion of the combination;

maintaining the pressure on the combination at the reduced level while lowering the temperature of the combination to cause the combination to freeze; and, subjecting the frozen combination to lyophilization to remove moisture therein to render the state of the product substantially solid when at normal environmental temperatures.

2. The method of claim 1 wherein the flavor component is selected from the group consisting of natural and artificial fruit juices, natural and artificial vegetable juices, natural plant extracts, artificial flavors and flavorful materials capable of concentration by lyophilization.

3. The method of claim 1 wherein the dietary fiber component is present in the lyophilized combination in a percentage by weight of at least fifty percent.

4. The method of claim 1 wherein the dietary fiber component is selected from the group consisting of an insoluble fiber, a soluble fiber and a combination thereof.

5. The method of claim 4 wherein the dietary fiber component is present in the lyophilized combination in a percentage by weight of at least fifty percent.

6. The method of claim 1 wherein the dietary fiber component is selected from the group consisting of vegetable brans, fruit fibers and combinations thereof.

7. The method of claim 6 wherein the dietary fiber component is present in the lyophilized combination in a percentage by weight of at least fifty percent.

8. The method of claim 1 wherein the flavor component is selected from the group consisting of natural and artificial fruit juices, natural and artificial vegetable juices, natural plant extracts, artificial flavors and flavorful materials capable of concentration by lyophilization and the dietary fiber component is selected from the group consisting of an insoluble fiber, a soluble fiber and a combination thereof.

9. The method of claim 8 wherein the dietary fiber component is present in the lyophilized combination in a percentage by weight of at least fifty percent.

10. The method of claim 1 wherein the pressure imposed on the combination to cause volumetric expansion of the combination is approximately 28 inches of mercury.

11. A substantially solid nutritional food product rich in dietary fiber and having improved organoleptic characteristics when consumed as a solid food product, the product being prepared by a process consisting of the steps of:

contacting a dietary fiber component with a flavor component capable of being concentrated by lyophilization, the flavor component being absorbed into or adsorbed on the fiber, the dietary fiber component being additional to any dietary fiber present in the flavor component;

reducing the temperature of the combination of the dietary fiber and flavor component to a temperature immediately above the freezing point of the combination;

reducing pressure imposed on the combination to cause volumetric expansion of the combination;

maintaining the pressure on the combination at the reduced level while lowering the temperature of the combination to cause the combination to freeze; and, subjecting the frozen combination to lyophilization to remove moisture therein to render the state of the product substantially solid when at normal environmental temperatures.

12. A method of making a substantially solid nutritional food product rich in dietary fiber and having improved organoleptic characteristics when consumed as a solid food product, comprising the steps of:

contacting a dietary fiber component with a flavor component capable of being concentrated by lyophilization, the flavor component being absorbed into or adsorbed on the fiber, the dietary fiber component being additional to any dietary fiber present in the flavor component;

freezing the combination of the dietary fiber component and flavor component; and, subjecting the frozen combination to lyophilization to remove moisture therein to render the state of the product substantially solid when at normal environmental temperatures, the dietary fiber component being present in the lyophilized combination in a percentage by weight of at least fifty percent.

13. The method of claim 12, wherein the dietary fiber component is selected from the group consisting of an insoluble fiber, a soluble fiber and a combination thereof.

14. A method of making a substantially solid nutritional food product rich in dietary fiber and having improved organoleptic characteristics when consumed as a solid food product, comprising the steps of:

contacting a dietary fiber component with a flavor component capable of being concentrated by lyophilization, the flavor component being absorbed into or adsorbed on the fiber, the dietary fiber component being additional to any dietary fiber present in the flavor component, the dietary fiber component being present in the lyophilized combination in a percentage by weight of at least fifty percent;

freezing the combination of the dietary fiber component and flavor component; and, subjecting the frozen combination to lyophilization to remove moisture therein to render the state of the product substantially solid when at normal environmental temperatures.

* * * * *